(12) United States Patent
Schulz et al.

(10) Patent No.: US 9,558,131 B1
(45) Date of Patent: Jan. 31, 2017

(54) INTEGRATED CIRCUIT WITH BONDING CIRCUITS FOR BONDING MEMORY CONTROLLERS

(75) Inventors: Jeffrey Schulz, Milpitas, CA (US); Chiakang Sung, Milpitas, CA (US); Michael H. M. Chu, Fremont, CA (US)

(73) Assignee: Altera Corporation, San Jose, CA (US)

( * ) Notice: Subject to any disclaimer, the term of this patent is extended or adjusted under 35 U.S.C. 154(b) by 1326 days.

(21) Appl. No.: 13/164,426

(22) Filed: Jun. 20, 2011

(51) Int. Cl.
*G06F 13/00* (2006.01)

(52) U.S. Cl.
CPC .................................. *G06F 13/00* (2013.01)

(58) Field of Classification Search
CPC combination set(s) only.
See application file for complete search history.

(56) References Cited

U.S. PATENT DOCUMENTS

| | | | |
|---|---|---|---|
| 6,216,240 B1* | 4/2001 | Won et al. | 714/718 |
| 8,074,033 B1* | 12/2011 | Yearsley | 711/154 |
| 2002/0080281 A1* | 6/2002 | Yoshiyama et al. | 348/623 |
| 2003/0117119 A1* | 6/2003 | Bridge | 323/282 |
| 2004/0117566 A1* | 6/2004 | McClannahan et al. | 711/154 |
| 2005/0038844 A1* | 2/2005 | Langhammer et al. | 708/620 |
| 2007/0233903 A1* | 10/2007 | Pyeon | 710/1 |

* cited by examiner

*Primary Examiner* — Charles Rones
*Assistant Examiner* — Han Doan (57) ABSTRACT

An IC that includes a first memory controller, a second memory controller, and a first bonding circuit coupled to the first memory controller, where the first bonding circuit is a hard logic bonding circuit and is operable to coordinate memory control functions of the first memory controller and the second memory controller. In one implementation, the first memory controller is an N bits wide memory controller, the second memory controller is an M bits wide memory controller, and the first bonding circuit is operable to coordinate the memory control functions of the first memory controller and the second memory controller such that the first and second memory controllers together function as an N+M bits wide memory controller, where N and M are positive integers.

19 Claims, 6 Drawing Sheets

INTEGRATED CIRCUIT WITH BONDING CIRCUITS FOR BONDING MEMORY CONTROLLERS

BACKGROUND

Conventional hard memory controllers (which may also herein be referred to as memory interfaces) are generally designed for controlling (or interfacing with) a memory of a particular data width. For example, a conventional hard memory controller may be designed to control a memory of 32 bits or 64 bits. As used herein a hard memory controller is constructed using hard logic that is not configurable for a function other than that of a memory controller. This contrasts with a soft logic memory controller which is configured/programmed to function as a memory controller, but can also be configured/programmed to serve other functions.

Some conventional hard memory controllers allow for using the memory controller for the maximum data width for which the memory controller is designed as well as some data width(s) smaller than the maximum data width. For example, some conventional memory controllers capable of controlling a 64 bits memory may also be used to control a 32 bits wide memory. This provides some flexibility. However, it does so at the expense of wasted hardware when the memory controller is used to control memory of a data width less than the maximum data width that the memory controller is capable of controlling. Thus, with conventional hard memory controller designs, supporting multiple memory data widths can be very expensive since each different memory data width must have hardware built which covers at least that data width.

Moreover, with conventional hard memory controller designs, supporting multiple memory data width combinations can be very expensive since hardware must be built which covers all the combinations. For example, supporting the combinations of (1) two 64 bits wide memories, (2) one 64 bits wide memory, and (3) four 32 bits wide memories would require (a) two 64 bits wide memory controllers and four 32 bits wide memory controllers, without the option of using a 64 bits wide memory controller as a 32 bits wide memory controller, or (b) two 64 bits wide memory controllers and two 32 bits wide memory controllers, with the option of using a 64 bits wide memory controller as a 32 bits wide memory controller. However, using the two 64 bits wide memory controllers and two 32 bits wide memory controllers to support four 32 bits wide memories amounts to wasting some of the resources of the 64 bits wide memory controllers. Also, it involves use of multiplexer(s) for selecting between using the 64 bits wide memory controllers as 64 bits wide memory controllers or 32 bits wide memory controllers.

SUMMARY

In one aspect, an embodiment of the present invention provides an integrated circuit (IC) that includes a first memory controller, a second memory controller, and a first bonding circuit coupled to the first memory controller, where the first bonding circuit is a hard logic bonding circuit and is operable to coordinate memory control functions of the first memory controller and the second memory controller. In one embodiment, the first memory controller is an N bits wide memory controller, the second memory controller is an M bits wide memory controller, and the first bonding circuit is operable to coordinate the memory control functions of the first memory controller and the second memory controller such that the first and second memory controllers together function as an N+M bits wide memory controller, where N and M are positive integers.

An embodiment of the present inventions allows building a set of hard memory controllers which can either be (1) functionally combined together for customers who want a fewer number of higher bandwidth memory controllers or (2) used as standalone memory controllers by customers who want a larger number of lower bandwidth memory controllers. With an embodiment of the present invention, fewer sizes (and, if desired, only one size) of a hard memory controller need be designed, verified and laid out on an IC, versus needing to have a combination of higher and lower bandwidth memory controllers, each with its own design, verification, and IC layout challenges and expense. This allows for using a smaller die area than building a combination of lower bandwidth and higher bandwidth memory controllers would require.

BRIEF DESCRIPTION OF THE DRAWINGS

The novel features of the invention are set forth in the appended claims. However, for purpose of explanation, several aspects of particular embodiments of the invention are described by reference to the following figures.

DETAILED DESCRIPTION

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
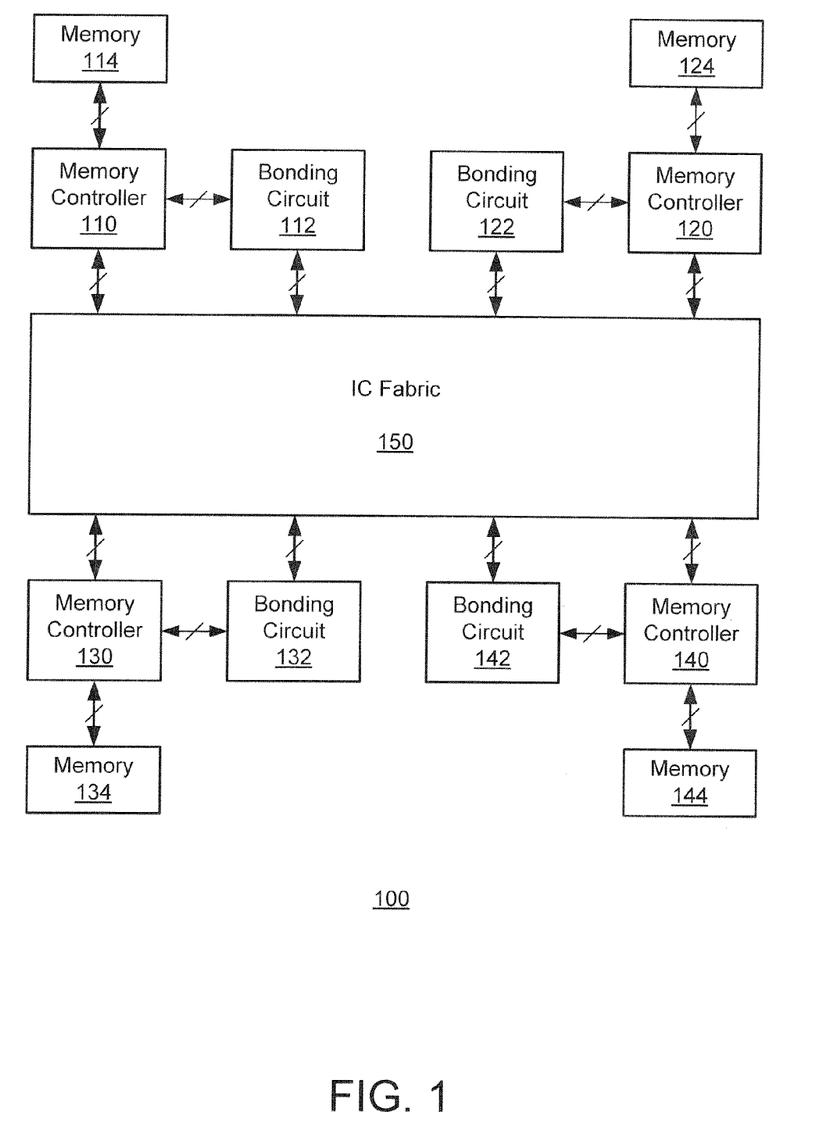
FIG. 1 is a block diagram of one embodiment of an IC of the present invention.

FIG. 1 is a block diagram of one embodiment of an IC of the present invention. IC 100 includes memory controllers 110, 120, 130, 140, bonding circuits 112, 122, 132, 142, memories 114, 124, 134, 144, and IC fabric 150. Memory controller 110 is coupled to bonding circuit 112, memory 114, and IC fabric 150. Memory controller 120 is coupled to bonding circuit 122, memory 124, and IC fabric 150. Memory controller 130 is coupled to bonding circuit 132, memory 134, and IC fabric 150. Memory controller 140 is coupled to bonding circuit 142, memory 144, and IC fabric 150. Bonding circuits 112, 122, 132, 142 are coupled to IC fabric 150. Bonding circuits 112, 122, 132, 142 are respectively associated with memory controllers 110, 120, 130, 140.

It is to be noted that in IC 100, the coupling between the aforementioned elements of IC 100 are multi-lane couplings. Additionally, the coupling between some elements may be between separate sub-elements of the respective elements. For example, as will be explained in greater detail below, a bonding circuit (e.g., bonding circuit 112) includes three sub-elements, each of which is coupled via IC fabric 150 to the corresponding sub-element in the paired bonding circuit (e.g., bonding circuit 122) which also includes three sub-elements.

In one embodiment, when configuring IC 100, a user (which may also herein be referred to as a customer) decides whether memory controllers in IC 100 should be bonded. This would be determined, for example, by the number and size of memory controllers that the user prefers to have in IC 100. If bonding is needed, then IC 100 is configured such that the appropriate memory controllers are bonded using their associated bonding circuits and IC fabric 150. Memory controllers that are not bonded act as standalone memory controllers, rather than as bonded ones. Additionally, in one embodiment, a user may choose to bond some, but not all ports, of memory controllers that are to be bonded. For example, a user may choose to bond the read ports, but not the write ports of memory controllers. Additionally, in one embodiment, different ports of the memory controllers can be serviced in different order when two memory controllers are bonded.

For bonded memory controllers, the data busses (not shown) in IC fabric 150 are divided in proportion to the memory widths of the memories associated with the memory controllers. In one embodiment, when a transaction request (e.g., a read data from or write data to request) is issued in IC fabric 150, the transaction request is sent to both bonded memory controllers (even in the event that no data is to be read from or written into one of the memories associates with one of the bonded memory controllers, e.g., in the event that a write with no byte enables is asserted for one of the bonded memory controllers). Similarly, in one embodiment, when data/signals are returned to IC fabric 150 from memory controllers, bonding circuits ensure that the sets of data/signals returned from both bonded memory controllers are the same type of data/signal and are returned in the same clock cycle.

In IC 100, slimmer (e.g., 32 bits wide) hard memory controllers, when not bonded, are used to perform lower bandwidth (e.g., 32 bits wide) memory control and, when bonded, are used to perform higher bandwidth (e.g., 64 bits wide) memory control. This has advantages relative to the conventional memory controller structures, such as those described in the Background section. First, it has lower design, verification and layout costs as the slimmer hard memory controller is designed, verified and laid out but the wider hard memory controller is not. It is to be noted that non-symmetric designs (e.g., having a 64 bits wide controller and a 32 bits wide controller, as opposed to two 32 bits wide controllers) are more problematic and require more work for layout. This is true, for example, in the case of ICs that are programmable logic device (PLDs). Second, it requires a smaller die area because (1) the slimmer memory controller requires less die area than the wider memory controller and (2) the slimmer memory controller requires smaller data path circuitry than the wider memory controller. It is to be noted that, in some ICs, approximately 60 to 70% of a 32 bit memory controller's associated die area is in the datapath logic. Also, in some ICs, the die area scales linearly with data path width. In one embodiment, a 64/32 bits wide memory controller combination takes approximately 30% more die area than a 32/32 bits wide memory controller combination with bonding.

In one embodiment, each of memory controllers 110, 120, 130, 140 is for controlling a 32 bits wide memory. In one such embodiment, two bonding circuits (e.g., bonding circuits 112 and 122) bond their respective associated memory controllers (e.g., memory controllers 110 and 120) such that the associated memory controllers (e.g., memory controllers 110 and 120) together act as a memory controller for a 64 bits wide memory. Also, in the above embodiment, with bonding circuits 112, 122, 132, and 142, IC 100 can be configured such that memory controllers 110, 120, 130, 140 can together function as (1) four 32 bits wide memory controllers, (2) one 64 bits wide memory controller and two 32 bits wide memory controller, or (3) two 64 bits wide memory controllers.

In another embodiment, there may be more or less memory controllers and associated bonding circuits than those shown in FIG. 1. Also, in another embodiment, the memory controllers may be for controlling memories wider or narrower than a 32 bits wide memory. Also, in another embodiment, more than two memory controllers can be bonded together by scaling the bonding circuits as needed.

In another embodiment, bonding circuits may be used to bond memory controllers of different sizes, e.g., a memory controller for controlling a 32 bits wide memory may be bonded with a memory controller for controlling a 64 bits wide memory. More generally, embodiments of the bonding circuits of the present invention may be used to bond an N bits wide memory controller with an M bits wide memory controller such that they together function as an N+M bits wide memory controller, where N and M are positive integers and may be equal or unequal to one another. This allows for efficient support for non-standard memory widths, especially when N and M are unequal. In one embodiment, the bonding circuits bond the N bits wide memory controller with the M bits wide memory controller by coordinating the memory control functions of the N bits wide memory controller and the M bits wide memory controller such that the N bits wide memory controller and the M bits wide memory controller together function as an N+M bits wide memory controller. In one embodiment, the bonding circuits allow for combining the memory control functions of the N bits wide memory controller and the M bits wide memory controller such that the N bits wide memory controller and the M bits wide memory controller together function as an N+M bits wide memory controller. In one embodiment, the IC fabric with the bonding circuits is operable to bond memory controllers as described above. Also, in one embodiment, memory controllers for controlling memories of different speeds or having different error detection features may be bonded together. It is to be noted that an N bits wide memory controller refers to a memory controller that, when used as a standalone memory controller (as opposed to a bonded memory controller), controls a memory that is N bits wide.

In another embodiment, bonding circuit 112 may be directly coupled to bonding circuit 122, instead of via IC fabric 150. In such an embodiment, bonding circuits 112 and 122 bond memory controllers 110 and 120. Similarly, in one embodiment, bonding circuit 132 may be directly coupled to bonding circuit 142, instead of via IC fabric 150. In such an embodiment, bonding circuits 132 and 142 bond memory controllers 130 and 140.

In one embodiment, memory controllers 110, 120, 130, 140 are hard memory controllers, as opposed to soft logic memory controllers. Similarly, in one embodiment, bonding circuit 112, 122, 132, 142 are hard bonding circuits, as opposed to soft bonding circuits. As noted above, a hard memory controller is constructed using hard logic and is not configurable for a function other than that of a memory controller. This contrasts with a soft logic memory controller which is configured/programmed to function as a memory controller, but can also be configured/programmed to serve other functions. Similarly, a hard bonding circuit is constructed using hard logic and is not configurable for a function other than that of a bonding circuit. Also, in one embodiment, IC fabric 150 contains the routing circuitry and soft logic (i.e., configurable/programmable logic) of the IC 100.

In FIG. 1, memory controller 110 is shown as being separate from memory 114. Alternatively, memory controller 110 may be shown as being part of memory 114. In such a case, bonding circuit 112 would be directly coupled to memory 114. Similarly, in such a case, memory 114 would be directly coupled to IC fabric 150. Similar alternative representations may be shown for memory controllers 120, 130, 140 with their respective associated memories 124, 134, 144.

In one embodiment, bonded memories in IC 100 include first-in-first-out (FIFO) memories. Moreover, in one embodiment, the bonded FIFOs have the same width and same FIFO number. For example, a read FIFO 1 on a first memory (or first memory controller) is bonded with a read FIFO 1 on a second memory (or second memory controller).

Figure 2:
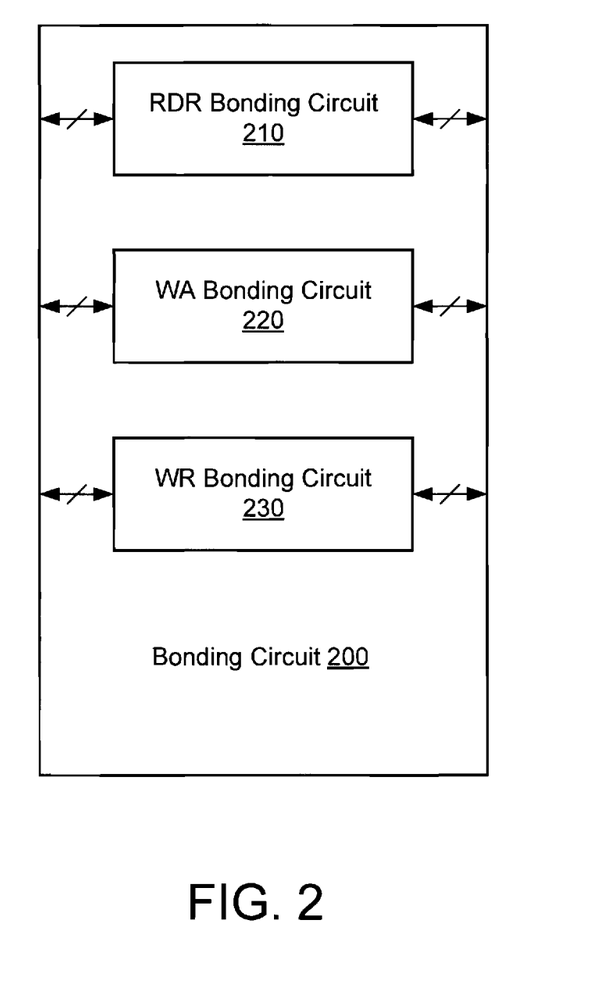
FIG. 2 is a block diagram of a bonding circuit shown in FIG. 1.

FIG. 2 is a block diagram of a bonding circuit shown in FIG. 1. More specifically, in FIG. 2, bonding circuit 200 shows a more detailed diagram of each of bonding circuits 112, 122, 132, 142 of FIG. 1. In FIG. 2, bonding circuit 200 includes read data return (RDR) bonding circuit 210, write acknowledge (WA) bonding circuit 220, and write ready (WR) bonding circuit 230. RDR bonding circuit 210 is coupled to the RDR bonding circuit (not shown) of the bonding circuit (not shown) with which bonding circuit 200 is paired. Similarly, WA bonding circuit 220 is coupled to the WA bonding circuit (not shown) of the bonding circuit with which bonding circuit 200 is paired. Similarly, WR bonding circuit 230 is coupled to the WR bonding circuit (not shown) of the bonding circuit with which bonding circuit 200 is paired. In one embodiment, the RDR bonding is for sending data read from memories to the IC fabric which issues the read command. Also, in one embodiment, the WA bonding is for sending a write done signal from the memories to the IC fabric which issues a write command. Finally, in one embodiment, the WR bonding is for sending a write ready command to the IC fabric indicating that the memories are ready to accept write data.

Figure 3:
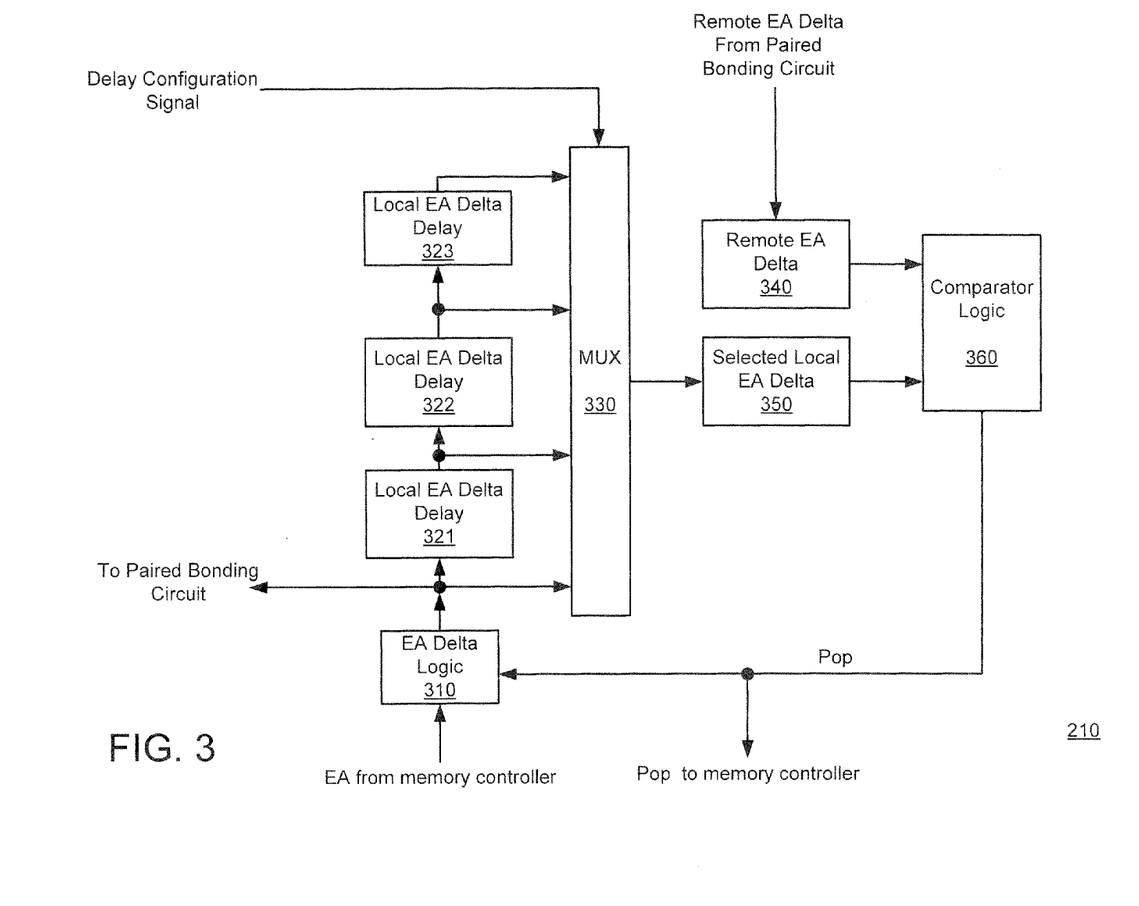
FIG. 3 is a detailed block diagram of the read data return bonding circuit shown in FIG. 2.

FIG. 3 is a more detailed block diagram of the RDR bonding circuit shown in FIG. 2. In FIG. 3, RDR bonding circuit 210 includes EA delta logic circuit 310, local EA delta delay circuits 321, 322, 323, multiplexer 330 (which may also herein be referred to as selector 330), remote EA delta storage 340, selected local EA delta storage 350, and comparator logic circuit 360.

EA delta logic circuit 310 is coupled to comparator logic circuit 360, local EA delta delay circuit 321, and multiplexer 330. EA delta logic circuit 310 is also coupled to the memory controller (not shown) associated with bonding circuit 200 (which includes RDR bonding circuit 210). Additionally, EA delta logic circuit 310 is coupled to the bonding circuit (not shown) paired with bonding circuit 200. More specifically, EA delta logic circuit 310 is coupled to the RDR bonding circuit of the bonding circuit paired with bonding circuit 200. In one embodiment, bonding circuit 200 is coupled to its paired bonding circuit through the IC fabric.

In one embodiment, EA delta logic circuit 310 receives a pop value from comparator logic circuit 360. In one embodiment, the pop value is a binary 0 or 1. A pop value of 0 indicates that a data pop was not done, in the previous clock cycle, from the memory associated with bonding circuit 200. As used herein, the previous clock cycle refers to the clock cycle immediately preceding the current clock cycle. On the other hand, a pop value of 1 indicates that a data pop was done, in the previous clock cycle, from the memory associated with bonding circuit 200. EA delta logic circuit 310 also receives an EA value, for the current clock cycle, from the memory controller associated with bonding circuit 200. EA delta logic circuit 310 stores the EA value for the previous clock cycle. EA delta logic circuit 310 uses the values it receives and stores to determine an EA delta value. In one embodiment, the following relationship holds between EA delta and the other values mentioned above: EA delta (between current and previous cycles)=EA (current cycle)−EA (previous cycle)+1*pop (previous cycle). The EA delta value is a measure of the number of rows of data/signals pushed into the memory. It is to be noted that EA can change by more than one (up to the number of rows in the memory, which in one embodiment is a FIFO memory).

The EA delta value is output by EA delta logic circuit 310 to the bonding circuit paired with bonding circuit 200, to multiplexer 330, and local EA delta delay circuit 321. Local EA delta delay circuit 321 delays the EA delta value and outputs a first delayed version of EA delta value to multiplexer 330 and local EA delta delay circuit 322. Similarly, local EA delta delay circuit 322 delays the first delayed version of the EA delta value and outputs a second delayed version of EA delta value to multiplexer 330 and local EA delta delay circuit 323. Similarly, local EA delta delay circuit 323 delays the second delayed version of the EA delta value and outputs a third delayed version of EA delta value to multiplexer 330. Multiplexer 330 selects either the EA delta value or one of its delayed versions and provides the selected EA delta value to selected local EA delta storage 350. The selection by multiplexer 330 is determined by the delay configuration signal. In one embodiment, the delay configuration signal is received by multiplexer 330 from a configuration register in the memory controller associated with bonding circuit 200. Multiplexer 330 selects the EA delta value or its delayed version to account for delays in communication between bonding circuit 200 and its paired bonding circuit. This allows for the local EA delta value for bonding circuit 200 and the remote EA delta value received from the paired bonding circuit to correspond to the same clock cycle. As a result, both memory controllers will process corresponding data/signals in the same clock cycle. It is to be noted that the non-bonded memory controllers or ports are not impacted by the communication latency or delays between bonded memory controllers.

In addition to the selected EA delta value, comparator logic circuit 360 also receives the remote EA delta value from remote EA delta storage 340. In one embodiment, remote EA delta storage 340 receives (via the IC fabric) the remote EA delta value from the bonding circuit paired with bonding circuit 200. Comparator logic circuit 360 compares the selected EA delta value against zero. Similarly, comparator logic circuit 360 compares the remote EA delta value against zero. If both the selected EA delta value and the remote EA delta value are greater than zero, then comparator logic circuit 360 issues a pop value of 1. If either or both of the selected EA delta value and the remote EA delta value are not greater than zero, then comparator logic circuit 360 issues a pop value of 0. The pop value is provided to EA delta logic circuit 310 and to the memory controller associated with bonding circuit 200.

In one embodiment, the RDR bonding allows the read data from the two memory controllers to be returned with effectively one ready signal to the bus master which initiated the bus transaction. In one embodiment, the bus master is in the IC fabric.

Figure 4:
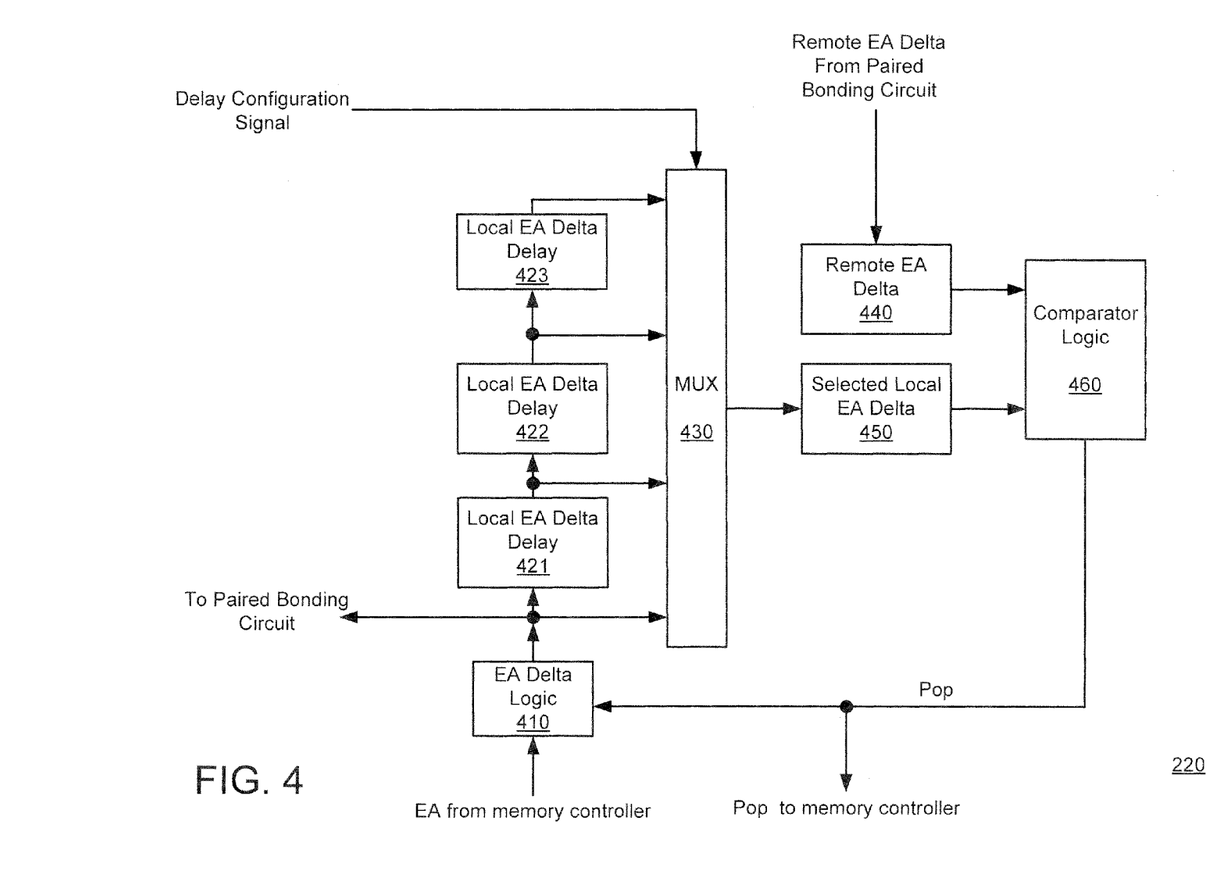
FIG. 4 is a detailed block diagram of the write acknowledge bonding circuit shown in FIG. 2.

FIG. 4 is a more detailed block diagram of the WA bonding circuit shown in FIG. 2. In FIG. 4, WA bonding circuit 220 includes EA delta logic circuit 410, local EA delta delay circuits 421, 422, 423, multiplexer 430 (which may also herein be referred to as selector 430), remote EA delta storage 440, selected local EA delta storage 450, and comparator logic circuit 460. WA bonding circuit 220 operates in a manner similar to the operation of RDR bonding circuit 210 described above. In WA bonding circuit 220, elements corresponding to their counterparts in RDR bonding circuit 210 have been referenced with reference numbers that differ from those of their corresponding counterparts in RDR bonding circuit 210 by 100. For example, comparator logic circuit 460 in WA bonding circuit 220 corresponds to comparator logic circuit 360 in RDR bonding circuit 210. In one embodiment, the WA bonding is used for synchronizing returning the write done signaling from the bonded memory controllers.

Figure 5:
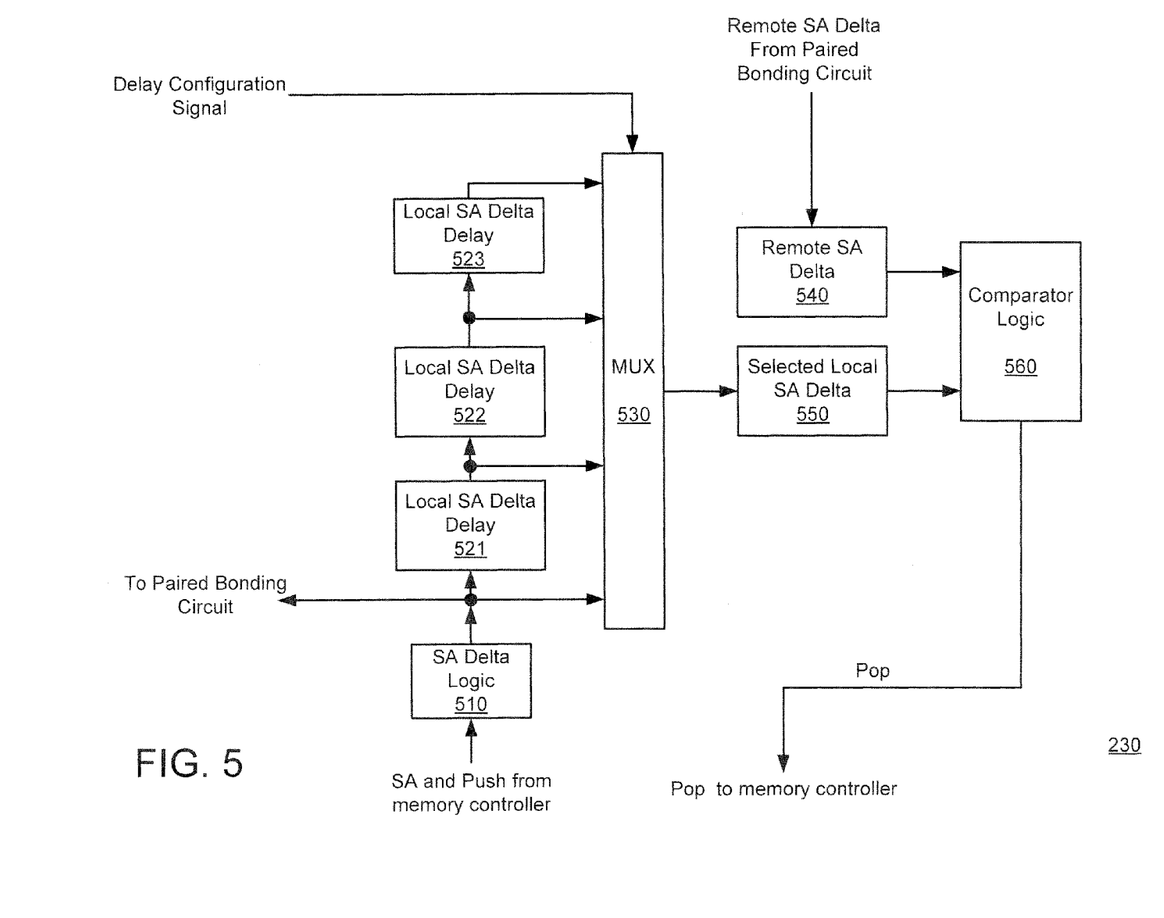
FIG. 5 is a detailed block diagram of the write ready bonding circuit shown in FIG. 2.

FIG. 5 is a more detailed block diagram of the WR bonding circuit shown in FIG. 2. In FIG. 5, WR bonding circuit 230 includes space available (SA) delta logic circuit 510, local SA delta delay circuits 521, 522, 523, multiplexer 530 (which may also herein be referred to as selector 530), remote SA delta storage 540, selected local SA delta storage 550, and comparator logic circuit 560. WR bonding circuit 230 operates in a manner similar to the operation of RDR bonding circuit 210 described above. In WR bonding circuit 230, elements corresponding to their counterparts in RDR bonding circuit 210 have been referenced with reference numbers that differ from their corresponding counterparts in RDR bonding circuit 210 by 200. For example, comparator logic circuit 560 in WR bonding circuit 230 corresponds to comparator logic circuit 360 in RDR bonding circuit 210.

Features of WR bonding circuit 230 that are different from those of RDR bonding circuit 210 are described below. The main difference between the operation of WR bonding circuit 230 and RDR bonding circuit 210 is that WR bonding circuit 230 operates on SA values and their associated delayed versions and derivates, rather than EA values and their associated delayed versions and derivates. Thus, for example, in WR bonding circuit 230, SA delta logic circuit 510 determines the SA delta value using the formula SA delta (between current and previous cycles)=SA (current cycle)−SA (previous cycle)+1*push (previous cycle). In one embodiment, SA delta is a measure of the number of rows of data/signals popped out of the memory. In determining SA delta, the push value rather than pop value is used. The push value has a binary value of 1 to indicate that data/signal was pushed into the memory in the previous clock cycle and a binary value of 0 to indicate that data/signal was not pushed into the memory in the previous clock cycle. Another difference between WR bonding circuit 230 and RDE bonding circuit 210 is the following. In WR bonding circuit 230, the pop value is not provided to SA delta logic circuit 510. Instead, SA delta logic circuit 510 receives the push value from the memory controller associated with bonding circuit 200. In another embodiment, SA delta logic circuit 510 may receive the pop value from comparator logic circuit 560 and not necessarily use it.

In one embodiment, the WR bonding is used for bonding memory controllers in operations involving write commands or use of the write data busses. In one embodiment, the WR signal is effectively a waitrequest signal.

In one embodiment, the above bonding circuits allow for avoiding scenarios, such as having one memory controller send data before its bonded memory controller is ready to do so, overpopping (i.e., popping without valid data), or writing over valid data. Also, in one embodiment of the bonding of the present invention, the internal states of the memory controllers need not be in synchronization. Thus, even without synchronization between the internal states of the memory controllers, an embodiment of the bonding circuits of the present invention allows the return of data/signals for the bonded memory controllers to be coordinated to occur in the same clock cycle. As a result, an embodiment of the bonding of the present invention allows the memory controllers to support a fault detection environment while not keeping the internal states of the memory controllers in synchronization. Consequently, feature compromises (such as turning off error correcting code (ECC) corrective write backs) do not need to be made when fault detection is enabled. Furthermore, bonding allows checking memory controllers to be supported without needing to do the extensive engineering analysis and real word debug of all possible events which could lead to a non-coordinated state.

Figure 6:
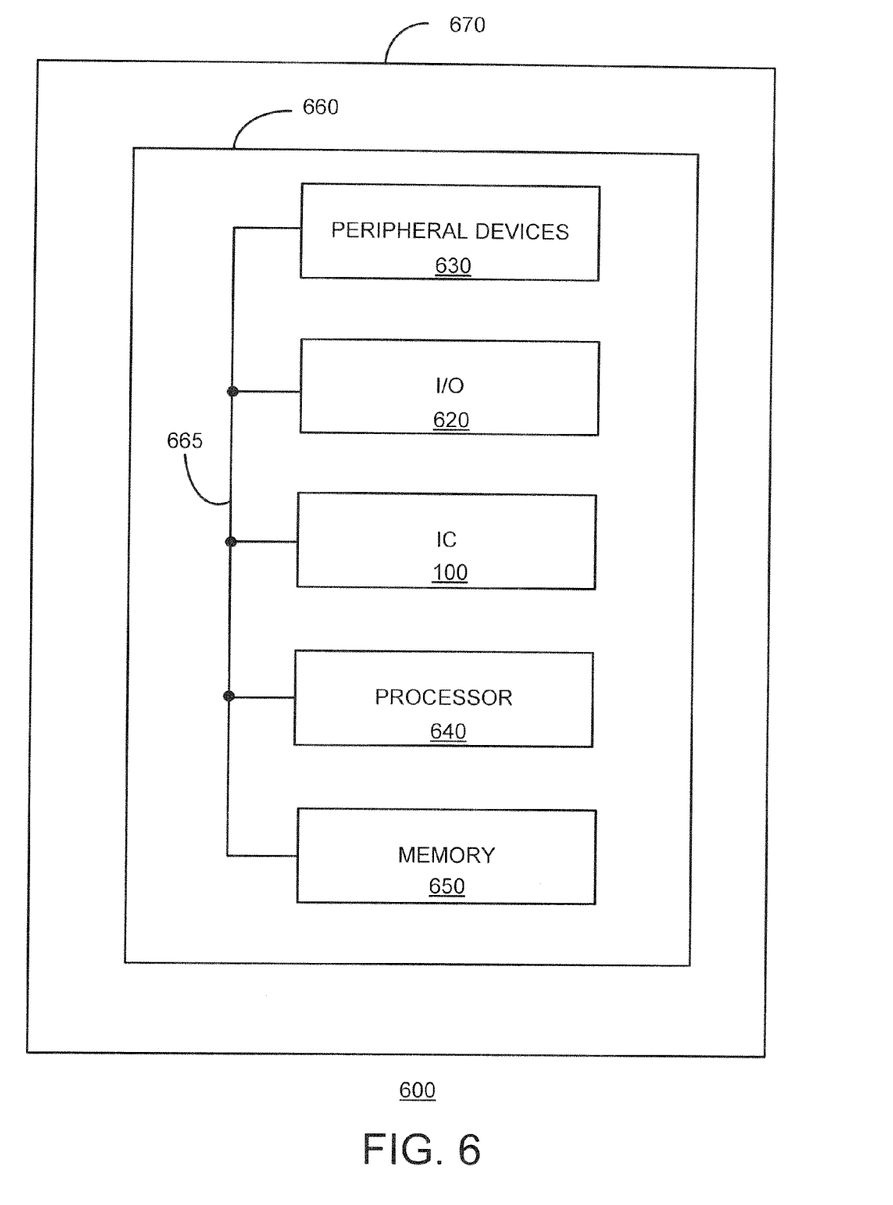
FIG. 6 illustrates an exemplary data processing system including an embodiment of an IC of the present invention.

FIG. 6 illustrates an exemplary data processing system including an embodiment of an IC of the present invention. In FIG. 6, data processing system 600 includes IC 100, input/output (I/O) circuitry 620, peripheral devices 630, processor 640, and memory 650. In one embodiment, these components are coupled together by system bus 665 and are populated on circuit board 660 which is contained in end-user system 670. A data processing system such as system 600 may include a single end-user system such as end-user system 670 or may include a plurality of systems working together as a data processing system.

As noted above, in one embodiment, an IC of the present invention is a PLD. Accordingly, in one embodiment, IC 100 is a PLD. PLDs (also sometimes referred to as complex PLDs (CPLDs), programmable array logic (PALs), programmable logic arrays (PLAs), field PLAs (FPLAs), erasable PLDs (EPLDs), electrically erasable PLDs (EEPLDs), logic cell arrays (LCAs), field programmable gate arrays (FPGAs), or by other names) provide the advantages of fixed ICs with the flexibility of custom ICs. Such devices typically provide an "off the shelf" device having at least a portion that can be programmed to meet a user's specific needs. Application specific integrated circuits (ASICs) have traditionally been fixed ICs. However, it is possible to provide an ASIC that has a portion or portions that are programmable. Thus, it is possible for an IC device to have qualities of both an ASIC and a PLD. The term PLD as used herein will be considered broad enough to include such devices.

PLDs have configuration elements that may be programmed or reprogrammed. Configuration elements may be realized as random access memory (RAM) bits, flip-flops, electronically erasable programmable read-only memory (EEPROM) cells, or other memory elements. Placing new data into the configuration elements programs or reprograms the PLD's logic functions and associated routing pathways. Configuration elements that are field programmable are often implemented as RAM cells (sometimes referred to a "configuration RAM" (CRAM)). However, many types of configurable elements may be used, including static or dynamic RAM (SRAM or DRAM), electrically erasable read-only memory (EEROM), flash, fuse, and anti-fuse programmable connections. The programming of configuration elements can also be implemented through mask programming during fabrication of the device. While mask programming may have disadvantages relative to some of the field programmable options already listed, it may be useful in certain high volume applications. For purposes herein, the generic term "configuration element" will be used to refer to any programmable element that may be configured to determine functions implemented by other PLD elements.

System 600 can be used in a wide variety of applications, such as computer networking, data networking, instrumentation, video processing, digital signal processing (DSP), or any other application where the advantage of using programmable or reprogrammable logic is desirable. IC 100 can be used to perform a variety of different logic functions. For example, IC 100 can be configured as a processor or controller that works in cooperation with processor 640 (or, in alternative embodiments, IC 100 might itself act as the sole system processor). IC 100 may also be used as an arbiter for arbitrating access to a shared resource in system 600. In yet another example, IC 100 can be configured as an interface between processor 640 and one of the other components in system 600. It should be noted that system 600 is only exemplary.

In one embodiment, system 600 is a digital system. As used herein a digital system is not intended to be limited to a purely digital system, but also encompasses hybrid systems that include both digital and analog subsystems.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. An integrated circuit (IC) comprising:
a first memory controller;
a second memory controller;
a first bonding circuit that is separate from the first memory controller, and that is coupled to the first memory controller; and
a second bonding circuit that is separate from the second memory controller and that is coupled to the second memory controller, wherein the first and second bonding circuits are hard bonding circuits that coordinate memory control functions of the first memory controller and the second memory controller.

2. The IC of claim 1, wherein:
the first memory controller is an N bits wide memory controller, wherein N is positive integer;
the second memory controller is an M bits wide memory controller, where M is a positive integer; and
the first and second bonding circuits coordinate the memory control functions of the first memory controller and the second memory controller such that the first and second memory controllers together function as an N+M bits wide memory controller.

3. The IC of claim 2, wherein M and N are each equal to 32 and the first memory controller and the second memory controller are operable to together function as a 64 bits wide memory controller.

4. The IC of claim 1, wherein the first and second memory controllers are hard memory controllers.

5. The IC of claim 1, wherein the first bonding circuit comprises:
an entries available (EA) delta logic circuit, wherein the EA delta logic circuit determines a local EA delta value for the first bonding circuit.

6. The IC of claim 5, wherein the first bonding circuit further comprises:
a comparator logic circuit, wherein the comparator logic circuit (a) determines whether a selected local EA delta value is greater than zero, (b) determines whether a remote EA delta value received from a second bonding circuit is greater than zero, and (c) provides a memory pop signal to a memory coupled to the first memory controller, wherein the memory pop signal has a binary value of 1 if both the selected local EA delta value and the remote EA delta value are greater than zero, and wherein the memory pop signal has a binary value of 0 if either or both of the selected local EA delta value and the remote EA delta value are not greater than zero.

7. The IC of claim 6, wherein the first bonding circuit further comprises:
a plurality of delay circuits coupled to the EA delta logic circuit, wherein the plurality of delay circuits produce a plurality of delayed versions of the local EA delta value; and
a selector coupled to the plurality of delay circuits and the EA delta logic circuit, wherein the selector selects the local EA delta value or a delayed version of the local EA delta value and provides the selected local EA delta value to the comparator logic circuit.

8. The IC of claim 7, wherein the first bonding circuit further comprises:
a remote EA delta storage for storing the remote EA delta value, wherein the remote EA delta storage is coupled to the comparator logic circuit; and
a selected local EA delta storage for storing the selected local EA delta value, wherein the selected local EA delta storage is coupled to the comparator logic circuit.

9. The IC of claim 1 further comprising:
a first memory coupled to the first memory controller;
a second memory coupled to the second memory controller; and
an IC fabric coupled to the first memory controller, the second memory controller, the first bonding circuit, and the second bonding circuit, wherein the first bonding circuit, the second bonding circuit, and the IC fabric coordinate memory control functions of the first memory controller and the second memory controller.

10. The IC of claim 1, wherein the IC is a programmable logic device.

11. A digital system comprising the IC of claim 1.

12. An integrated circuit (IC) comprising:
a first memory controller; and
a first bonding circuit coupled to the first memory controller, wherein the first bonding circuit comprises an entries available (EA) delta logic circuit, wherein the EA delta logic circuit determines a local EA delta value for the first bonding circuit, wherein the local EA delta value is equal to an EA value for a current clock cycle minus an EA value for a preceding clock cycle plus a memory pop value for the preceding clock cycle, wherein the first bonding circuit comprises:

a comparator logic circuit that generates the memory pop value for the preceding clock cycle and that generates a memory pop signal for the current clock cycle based on at least the local EA delta value.

13. The IC of claim 12, wherein the first memory controller is a hard memory controller and the first bonding circuit is a hard logic bonding circuit.

14. The IC of claim 12, wherein the comparator logic circuit (a) determines whether a selected local EA delta value is greater than zero, (b) determines whether a remote EA delta value received from a second bonding circuit is greater than zero, and (c) provides the memory pop signal to a memory coupled to the first memory controller, wherein the memory pop signal has a binary value of 1 if both the selected local EA delta value and the remote EA delta value are greater than zero, and wherein the memory pop signal has a binary value of 0 if either or both of the selected local EA delta value and the remote EA delta value are not greater than zero.

15. The IC of claim 14, wherein the first bonding circuit further comprises:

a plurality of delay circuits coupled to the EA delta logic circuit, wherein the plurality of delay circuits produce a plurality of delayed versions of the local EA delta value; and a selector coupled to the plurality of delay circuits and the EA delta logic circuit, wherein the selector selects the local EA delta value or a delayed version of the local EA delta value and provides the selected local EA delta value to the comparator logic circuit.

16. The IC of claim 15, wherein the first bonding circuit further comprises:

a remote EA delta storage for storing the remote EA delta value, wherein the remote EA delta storage is coupled to the comparator logic circuit; and a selected local EA delta storage for storing the selected local EA delta value, wherein the selected local EA delta storage is coupled to the comparator logic circuit.

17. A method comprising:

with a bonding circuit, receiving an entries available (EA) value from a first memory controller;

with the bonding circuit, producing a local EA delta value for the bonding circuit, wherein the local EA delta value is equal to an EA value for a current clock cycle minus an EA value for a preceding clock cycle plus the value of a memory pop signal for the preceding clock cycle;

with a comparator circuit within the bonding circuit, receiving the local EA delta value; and with the comparator circuit, generating an updated memory pop signal for the current clock cycle based on at least the local EA delta value.

18. The method of claim 17 further comprising:

with the comparator circuit, determining whether a selected local EA delta value is greater than zero;

with the comparator circuit, determining whether a remote EA delta value received from an additional bonding circuit is greater than zero; and with the comparator circuit, providing the memory pop signal to a memory coupled to the first memory controller, wherein the memory pop signal has a binary value of 1 if both the selected local EA delta value and the remote EA delta value are greater than zero, and wherein the memory pop signal has a binary value of 0 if either or both of the selected local EA delta value and the remote EA delta value are not greater than zero.

19. The method of claim 18 further comprising:

producing a plurality of delayed versions of the local EA delta value; and selecting the local EA delta value or a delayed version of the local EA delta value.

* * * * *